United States Patent [19]
Garnett

[11] 3,721,505
[45] March 20, 1973

[54] FLUID MOTOR

[75] Inventor: Lawrence Taylor Garnett, Fullerton, Calif.

[73] Assignee: International Telephone and Telegraph Corporation, New York, N.Y.

[22] Filed: Aug. 25, 1971

[21] Appl. No.: 174,711

[52] U.S. Cl. .......................415/53, 73/228, 415/144
[51] Int. Cl. ...............................................F04d 5/00
[58] Field of Search ..........415/11, 53 T, 144; 73/228

[56] References Cited

UNITED STATES PATENTS

| | | | |
|---|---|---|---|
| 2,207,747 | 7/1940 | Manarik et al. | 73/228 |
| 2,724,338 | 11/1955 | Roth | 415/53 T |
| 3,257,955 | 6/1966 | Worst | 415/53 T |

*Primary Examiner*—C. J. Husar
*Attorney*—C. Cornell Remsen, Jr. et al.

[57] ABSTRACT

A flowmeter, the total angular travel of which is directly proportional to the total volume of a fluid flowing therethrough. A revolutions counter-indicator or the like is driven by a fluid motor having a bypass. The bypassed flow is turbulent over the otherwise linear portion of the motor curve and laminar at flow rates below the lowest turbulent flow rate. The bypass thus increases the range and accuracy of the flowmeter at low flow rates. A certain ratio greater than unity of inlet and outlet areas produces the same result as do internal ribs inside the motor housing.

13 Claims, 17 Drawing Figures

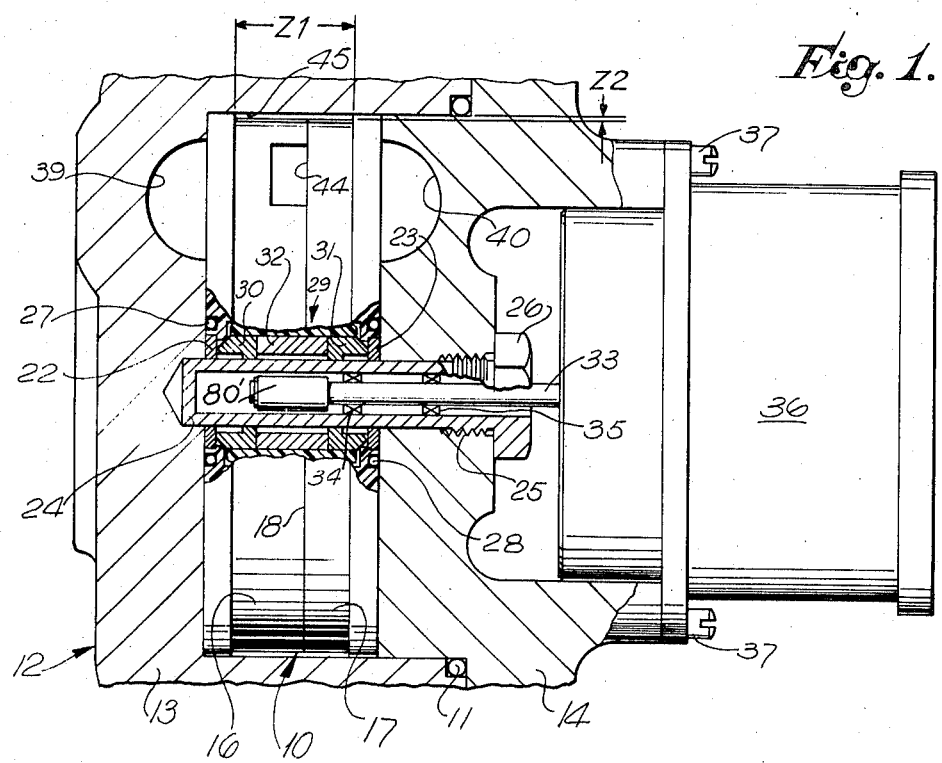
Fig. 1.
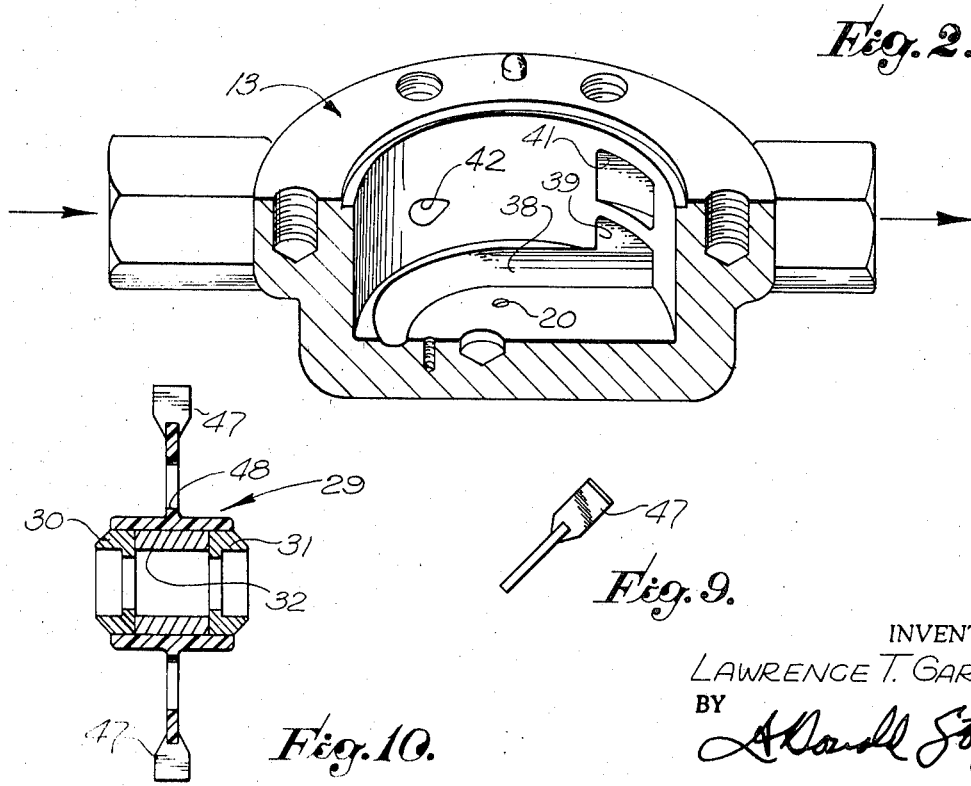
Fig. 2.
Fig. 9.
Fig. 10.
INVENTOR.
LAWRENCE T. GARNETT
BY
ATTORNEY

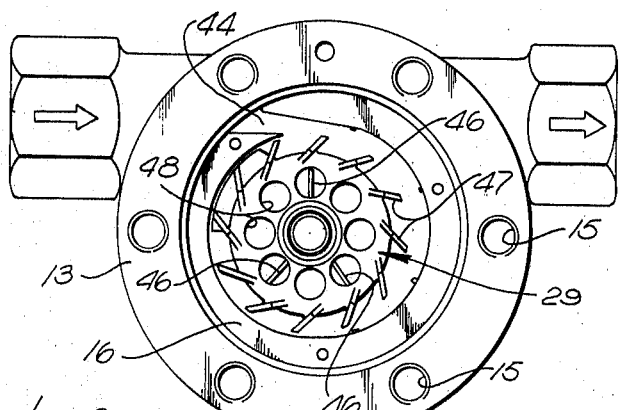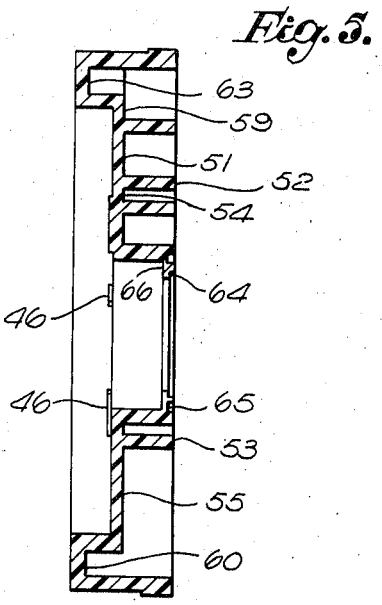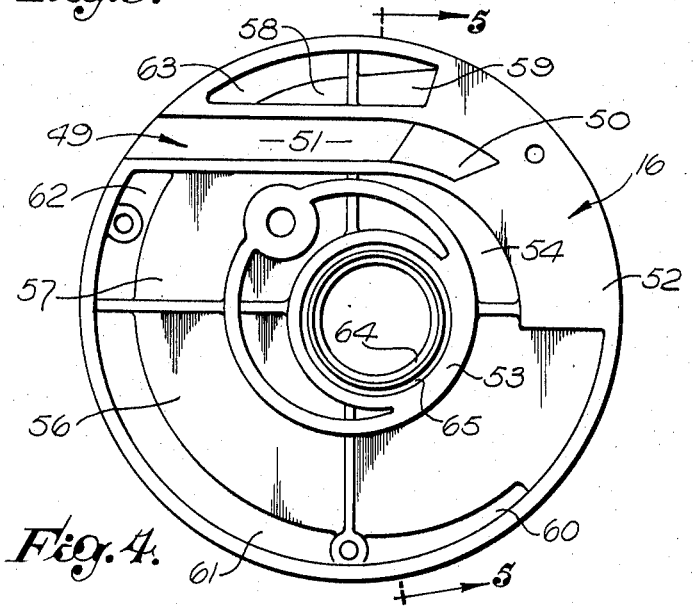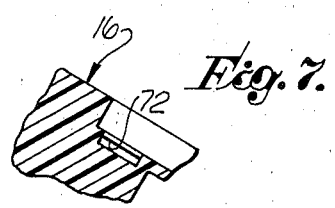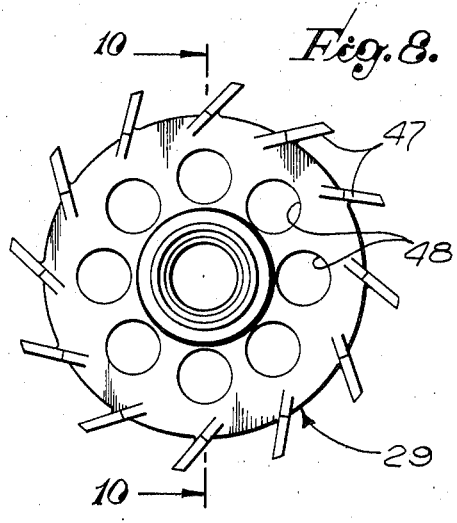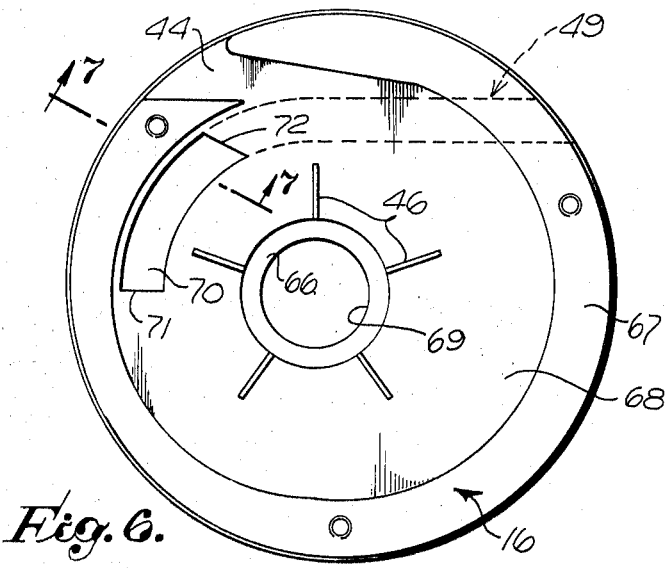

INVENTOR.
LAWRENCE T. GARNETT
BY
ATTORNEY

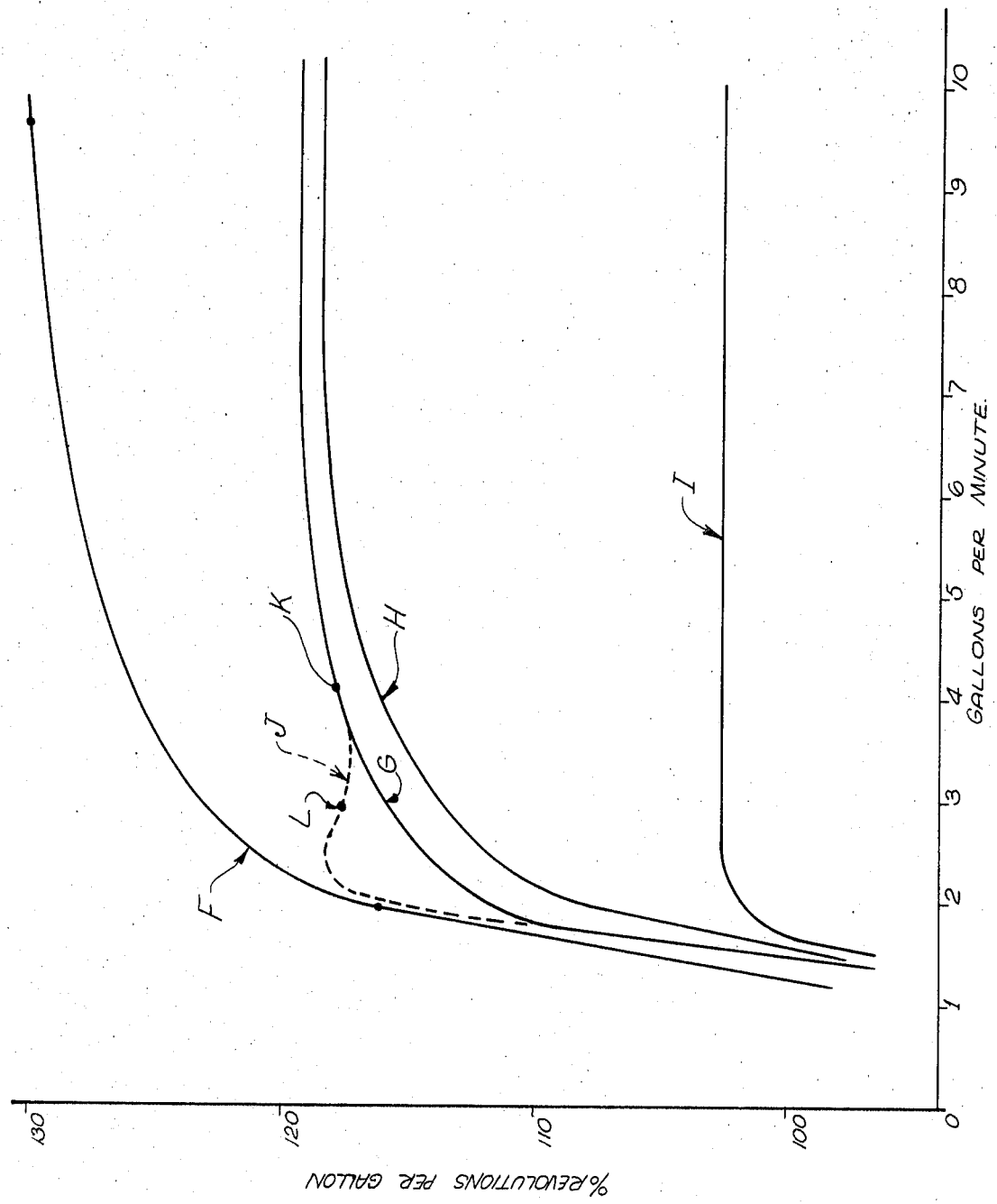

FLUID MOTOR

BACKGROUND OF THE INVENTION

This invention relates to devices to be driven by the flow of a fluid therethrough, and more particularly, to a highly accurate flowmeter or the like having a large range.

In the past, it has been the practice to employ a flowmeter incorporating a fluid motor with a bladed rotor. This rotor, when operated at high speeds, accurately turns at a rate directly proportional to the rate of liquid volume flow through the meter. However, at lower speeds, the speed per unit volume of liquid falls off sharply from what it is at higher speeds. This characteristic limits the range of the flowmeter and makes it so inaccurate that it cannot be used at the lower speeds.

SUMMARY OF THE INVENTION

In accordance with the device of the present invention, the above-described and other disadvantages of the prior art are overcome by providing means to increase the accuracy and the range of a flowmeter at low flow rates.

One outstanding feature of the present invention resides in the use of a bypass for the meter having a substantially constant percentage of leakage at high flow rates and a variable leakage at low flow rates which corrects for the fall in speed per unit volume of the fluid motor rotor at low flow rates. The range and accuracy of the flowmeter at low flow rates are thus increased by the use of the bypass.

Another feature of the invention resides in sizing the fluid or liquid inlet to the fluid motor in proper relation to the outlet therefrom so as to extend the range and accuracy to still lower flow rates.

Still another feature of the invention resides in the use of radially extending ribs, also hereinafter referred to as "spoilers," projecting inwardly from the fluid motor housing walls on opposite sides of the rotor, the walls lying generally in planes perpendicular to the rotor axis. This, too, increases flowmeter range and accuracy.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a longitudinal sectional view through a flowmeter constructed in accordance with the present invention;

FIG. 2 is a perspective view, partly in section, of a portion of the flowmeter shown in FIG. 1;

FIG. 3 is a side elevational view of a portion of the flowmeter shown in FIG. 1;

FIG. 4 is an end elevational view of a fluid motor housing;

FIG. 5 is a sectional view of the housing portion taken on the line 5—5 shown in FIG. 4;

FIG. 6 is an elevational view of one side of the housing portion opposite that shown in FIG. 4;

FIG. 7 is a sectional view of a discharge port of the housing portion shown in FIG. 6, and taken on the line 7—7 shown therein;

FIG. 8 is a side elevational view of the fluid motor rotor also shown in FIG. 3;

FIG. 9 is an elevational view of one of the rotor blades;

FIG. 10 is a transverse sectional view of the rotor taken on the line 10—10 shown in FIG. 8;

FIGS. 16 and 17 are graphs of operating characteristics of the present invention.

DESCRIPTION OF THE PREFERRED EMBODIMENT

Figure 11:
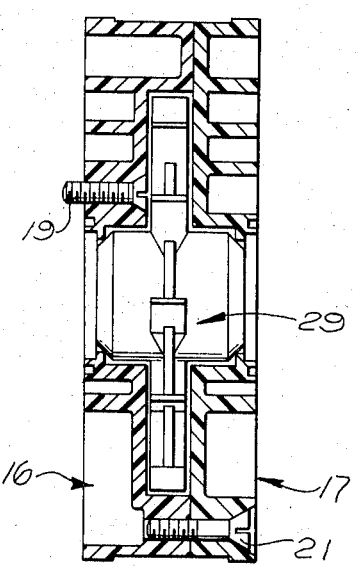
FIG. 11 is a sectional view of the fluid motor housing with the rotor mounted therein.

In FIG. 1, a fluid motor housing 10 is shown sealed by an O-ring 11 in a support 12 having parts 13 and 14 which are bolted together. See threaded bolt holes 15 in part 13 in FIG. 3.

Housing 10 has a thicker half 16 which abuts a thinner half 17 at a line 18.

Housing half 16 is fastened to part 13 by a screw 19 shown in FIG. 11 which is threaded into a hole 20, shown in FIG. 2. Three screws 21, shown in FIG. 11, hold halves 16 and 17 together. Halves 16 and 17 may be made of molded plastic. They rest upon metal washers 22 and 23, respectively. A hollow shaft 24 projects through washers 22 and 23 and is fixed relative to part 14 by a threaded connection at 25. Shaft 24 is turned into part 14 by a hex-headed flange 26.

An O-ring 27 seals housing half 16 to a wall of part 13. O-ring 28 seals housing half 17 to an opposite face of part 14. A rotor 29 carries two graphite bearings 30 and 31 fixed thereto. A radially polarized permanent magnet 32 is also fixed in rotor 29. A shaft 33 in bearings 34 and 35, fixed in shaft 24, carries a magnet (80') also radially polarized, whereby shaft 33 rotates synchronously with rotor 29.

Shaft 33 is connected to a revolutions counter 36 which indicates the total number of revolutions rotor 29 turns, or a fraction thereof.

Counter 36 may be entirely conventional and of the odometer type.

Counter 36 is mounted on part 14 by screws 37.

Part 13, as shown in FIG. 2, has a trough-shaped groove 38 which acts as a continuation of a discharge port 39. Part 14 has a similar trough 40 shown in FIG. 1 which meets with discharge port 41, shown in FIG. 2.

Also shown in FIG. 2 in part 13 is an inlet port 42 drilled in the casting of part 13. Inlet port 42 is aligned with a housing inlet 44, shown in FIG. 1.

An outstanding feature of the present invention resides in the use of a channel 45 which extends around the complete circumference of housing 10 and provides two bypass paths between inlet port 42 and discharge ports 39 and 41. Channel 45 may be 0.75 inch wide and 0.012 inch thick, as indicated by Z1 and Z2, respectively, in FIG. 1.

As shown in FIG. 3, housing half 16 has radially extending ribs 46. These ribs are also shown in FIG. 6. Rotor 29 has blades 47 and holes 48 therethrough.

In FIG. 4, housing half 16 has a discharge channel 49 to mate with groove 38 in part 13. A surface 50 is inclined upwardly to channel surface 51.

All of the surfaces shown in FIG. 3, except surface 50, are in the same plane or are in parallel planes. Surfaces 52 and 53 are in uppermost plane. Surfaces 54, 55, 56, 57, 58 and 59 are located in the next plane. Surfaces 60, 61, 62 and 63 are located in a plane below that. All the straight webs are located in a plane below the top plane of surfaces 52 and 53. Washer 22 sets on the ledge 64. The groove for O-ring 27 is indicated at 65.

As will be evident from FIG. 5, surface 51 lies within the same plane as surfaces 54 and 59.

Discharge channel 49 is so indicated in FIG. 6.

Flange 66, shown in FIG. 5, is again shown in FIG. 6. Surfaces 67 and 68 are flat and parallel, and perpendicular to the axis of hole 69. Surface 70 is flat but inclined downwardly toward the paper from a point 71 to a discharge opening 72. See FIG. 7.

An enlarged view of rotor 29 is shown in FIGS. 8 and 10. One rotor blade 47 is shown in FIG. 9. All parts of the rotor shown in FIG. 10 may be integral with the exception of bearings 30 and 31, and magnet 32.

Figure 12:
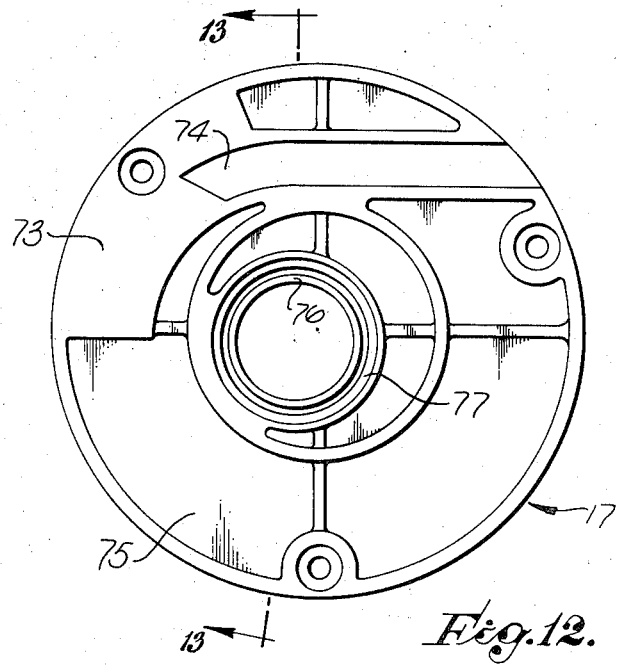
FIG. 12 is a side elevational view of the other half of the fluid motor housing.

In FIG. 12, with the exceptions of surfaces 73 and 74, and the top surfaces of the straight webs, all of the other surfaces lie in the same plane. The top surfaces of the straight webs lie in between the planes of surfaces 73 and 75. Ledge 76 holds washer 23. Groove 77 holds O-ring 28. See also FIG. 13.

Figure 13:
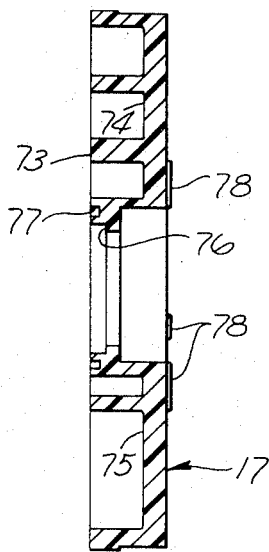
FIG. 13 is a sectional view of the housing half taken on the line 13—13 shown in FIG. 12.

Surface 74 is inclined in much the same fashion as surface 50. Surfaces 73 and 75 are in parallel planes as can be seen in FIG. 13.

Figure 14:
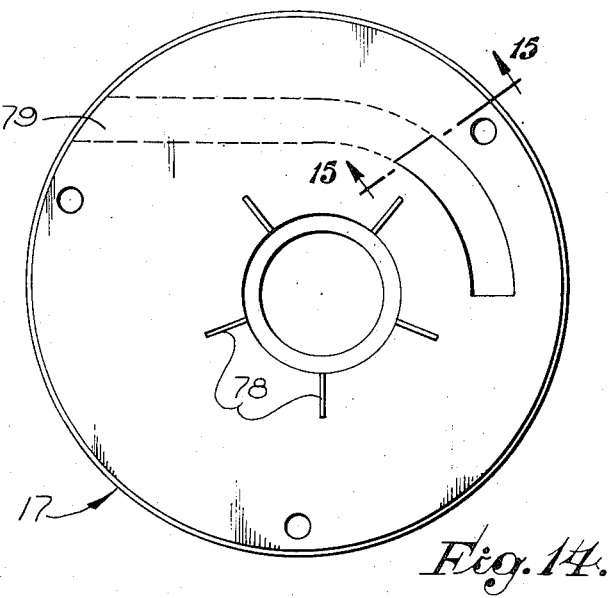
FIG. 14 is a side elevational view of the housing half opposite that side shown in FIG. 12.
Figure 15:
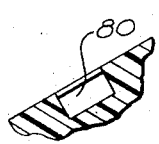
FIG. 15 is a sectional view of the housing half taken on the line 15—15 shown in FIG. 14.

As shown in FIG. 14, housing half 17 has ribs 78 similar to ribs 46, shown in FIG. 6. Housing half 17 also has a discharge channel 79 with an opening 80, as shown in FIG. 15.

Figure 16:
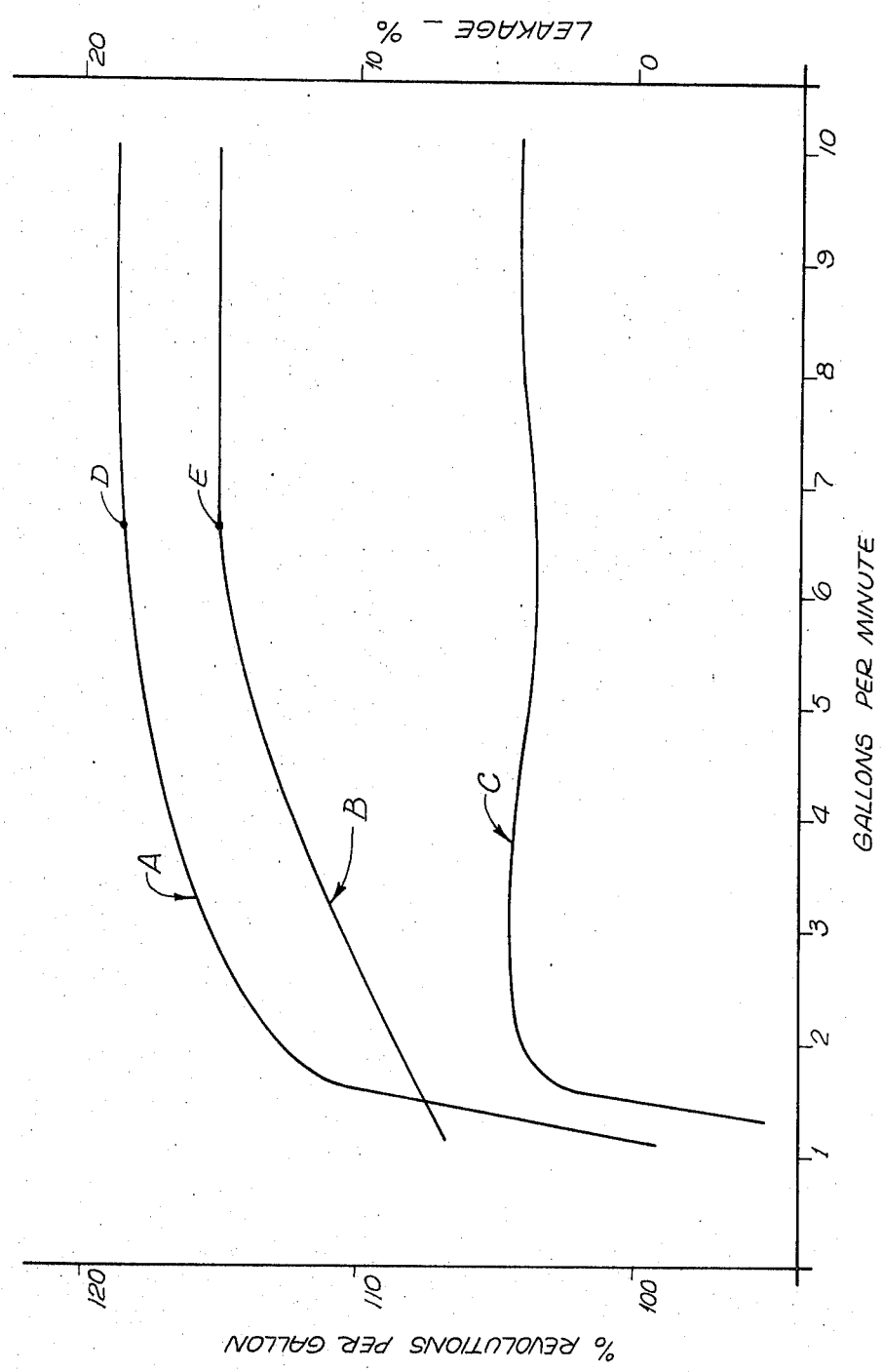

As shown in FIG. 16, the curve A shows the accuracy of the fluid motor without the channel 45. The ordinant for revolutions per gallon is expressed as a percent of a fixed number of revolutions per gallon. The abscissa is expressed in gallons per minute. Note will be taken that, for a fixed gear ratio between shaft 33 and counter 36, ideally the curve A should be a horizontally straight line from zero to the maximum flow rate. However, below point D, the accuracy of the flow meter declines rapidly.

Curve B shows the leakage of channel 45 (right hand legend) versus flow rate. Approximately at point E, the percent leakage through channel 45 drops off for lower flow rates. This ideally keeps curve A horizontal to a much lower flow rate. Thus, when channel 45 is combined with the flowmeter, a characteristic curve C is obtained as shown in FIG. 16. Curve C is the same type of curve as curve A with channel 45 added.

In FIG. 16, it will be noted that channel 45 may be empirically designed so that point E occurs at approximately the same flow rate as point D. Below point E, the flow through channel 45 is essentially laminar. Above point E, the flow in channel 45 is turbulent.

In FIG. 17, curve F shows the flowmeter characteristic with the inlet area much larger than the discharge area in housing 10, and without ribs 46 and 78.

Curves A and F are obtained both with the flowmeter alone and without channel 45 and the ribs, and with the inlet area much larger than discharge area.

When ribs 46 and 78 are added without using channel 45, curve H is obtained. As the inlet area is reduced and made to approach the exhaust area, a jet forms and is directly by the shape of the inlet port to impinge on the rotor blades. This jet is dissipated in turbulence at higher rotor speeds, but produces additional "impulse" torque at low flows. Curve J is an example of excessive impulse torque (accuracy is poor). An optimum sizing of inlet port in about a 10 percent greater area than exhaust port, to produce curve G. When the said ratio is 1.1, the ribs 46 and 78 are added and channel 45 is employed, the curve I is obtained.

When rotor 29 is in the position shown in FIG. 1, none of the ribs 46 and 78 touch it.

When the area of exhaust port 80 is (as shown) about two times that of exhaust port 72, the unbalanced upward flow of fluid out of housing 10 provides lift to rotor 29 (when rotor 29 is rotated) to reduce end thrust on bearings 30 and 31 and reduce friction to further extend linear performance at low flow rates.

From the foregoing, it will be appreciated that the flow path of the fluid through the fluid motor is in the direction of the arrows which are horizontal, as viewed in FIGS. 2 and 3.

Fluid enters the interior of part 13 at port 42 shown in FIG. 2. As stated previously, when the fluid motor is assembled as in FIG. 1, port 42 is aligned with housing inlet 44 shown in FIG. 1. There is thus fluid flow out of port 42 into inlet 44. However, as stated previously, this is not the only flow path. There are two other flow paths from port 42 in opposite directions around housing 10 in channel 45 to discharge ports 39 and 41.

The flow path through housing 10 is as follows. First fluid enters housing inlet 44. See housing inlet 44 in both of FIGS. 1 and 3. Fluid then flows around rotor 29 rotating it in FIG. 3 in a clockwise direction. Fluid then flows over inclined surface 70 and out of discharge opening 72. See housing inlet 44, surface 70 and discharge opening 72 in FIG. 6. See also discharge opening 72 in FIG. 7.

The fluid discharge through opening 72 is then carried in channel 49 (FIG. 4) and groove 38 (FIG. 2) to port 39 for discharge outside port 13 (FIG. 2). As stated previously, channel 49 mates with groove 38.

As shown, there are two similar discharge openings from housing 10, namely, openings 72 and 80 in FIGS. 7 and 15, respectively. We can now summarize again that there is fluid entry, two bypasses and inlet 44. There are, therefore, four discharges, namely, one for each bypass and one at each of the openings 72 and 80 on opposite sides of housing 10.

When fluid is discharged through opening 80, it it carried in discharge channel 79 having a bottom surface 74 (see FIGS. 12, 13 and 14) and groove or trough 40 (FIG. 1) to port 41 for discharge outside part 13.

What is claimed is:

1. A fluid motor comprising: a hollow housing; a rotor rotatably mounted in said housing, said housing having an inlet and at least one outlet spaced from said inlet, said rotor having a plurality of blades fixed relative thereto in a position to extend radially therefrom, said blades being movable with said rotor in positions to be driven by the flow of fluid into said inlet and out of said one outlet; and alternate flow means providing a passageway to bypass a portion of the fluid delivered to said inlet to said one outlet.

2. The invention as defined in claim 1, wherein said fluid motor without said alternate flow means has a speed per unit volume which decreases nonlinearly with rate of flow beginning at a predetermined rate of flow, said passageway having a size and shape such that flow therein is generally turbulent above said predetermined rate of flow and is generally laminar below said predetermined rate of flow, said alternate flow means causing the speed of said rotor per unit volume to be closer to its value at said predetermined rate of flow at flow rates therebelow that it is without the use of said alternate flow means.

3. The invention as defined in claim 2, wherein support means are provided, said housing being fixed relative to said support means, said support means including a body sealed around said housing, said body having an inlet port in alignment with said inlet and an outlet port positioned to receive fluid from said one outlet, said alternate flow means including an inner cylindrical wall of said body and an outer cylindrical wall of said housing positioned contiguous to said body inner cylindrical wall, said housing cylindrical wall having a channel therein extending circumferentially from said inlet to said one outlet.

4. The invention as defined in claim 3, wherein said channel is much wider than it is thick.

5. The invention as defined in claim 4, wherein said channel extends around the complete circumference of said housing, said housing having an outlet on opposite axial sides thereof, said channel being about 0.75 inch wide and about 0.012 inch thick.

6. A fluid motor comprising: a hollow housing; a rotor rotatably mounted in said housing, said housing having an inlet and at least one outlet spaced from said inlet, said rotor having a plurality of blades fixed relative thereto in a position to extend radially therefrom, said blades being movable with said rotor in positions to be driven by the flow of fluid into said inlet and out of said one outlet; the ratio of the area of said inlet to that of all of the outlets being of a magnitude to hold the speed of said rotor per unit volume of fluid passing through the motor at a substantially constant value over a range below which the said speed per unit volume is nonlinear with rate of flow when said ratio is not employed.

7. The invention as defined in claim 6, wherein said ratio is larger than that which produces two flexures in the speed per unit volume versus rate of flow characteristic.

8. The invention as defined in claim 7, wherein said ratio is greater than unity.

9. The invention as defined in claim 8, wherein said ratio is about 1.1 to 1.0.

10. A fluid motor comprising: a hollow housing; a rotor rotatably mounted in said housing, said housing having an inlet and at least one outlet spaced from said inlet, said rotor having a plurality of blades fixed relative thereto in a position to extend radially therefrom, said blades being movable with said rotor in positions to be driven by the flow of fluid into said inlet and out of said one outlet; said housing having a pair of spaced internal walls, said walls being approximately flat and parallel, said rotor being mounted in between said walls in a position such that its axis of rotation lies approximately perpendicular to said walls, said walls having aligned holes therethrough, said rotor having oppositely projecting hub portions extending into the respective holes, each wall having a plurality of raised lineal elements thereon extending radially from each hole.

11. The invention as defined in claim 10, wherein said elements are equally spaced.

12. The invention as defined in claim 11, wherein all of said elements have the same inside and outside radii, the outside radius being less than one-half the inside diameter of said housing.

13. A fluid motor comprising: a hollow housing; a rotor rotatably mounted in said housing, said housing having an inlet and at least one outlet spaced from said inlet, said rotor having a plurality of blades fixed relative thereto in a position to extend radially therefrom, said blades being movable with said rotor in positions to be driven by the flow of fluid into said inlet and out of said one outlet, said housing also having another outlet, said one outlet having an area about two times as large as that of said other outlet, the unbalanced upward flow of fluid out of said housing providing lift to said rotor when said rotor is rotated to reduce end thrust on said rotor and to reduce thrust bearing friction thereat to further extend linear performance at low flow rates.

* * * * *